H. H. Smith,
Mower.
No. 2401 Reissued Nov. 27. 1866.
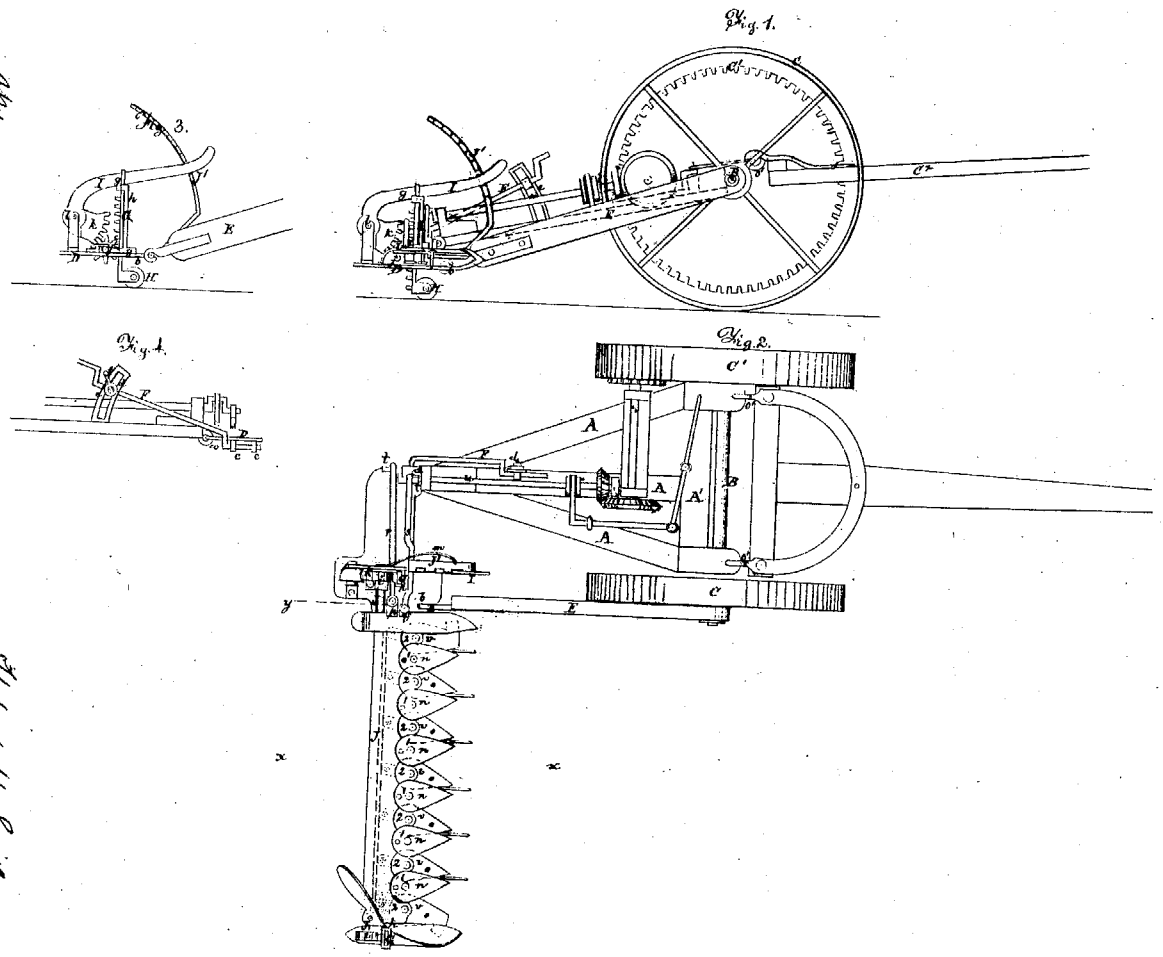
Witnesses
R. Leech
N. B. Smith
Hobart H. Smith.
by his Attorney
A. M. Smith

United States Patent Office.

IMPROVEMENT IN HARVESTERS.

HOBART H. SMITH, OF CARLISLE, PENNSYLVANIA, ASSIGNEE BY MESNE ASSIGNMENT OF C. M. LUFKIN.

DIV. C.

*Letters Patent No.* 18,173, *dated September* 8, 1857; *reissue No.* 2,401, *dated November* 27, 1866.

SPECIFICATION.

TO ALL WHOM IT MAY CONCERN:

Be it known that C. M. LUFKIN, of Acworth, in the county of Sullivan, and State of New Hampshire, invented certain new and useful improvements in Harvesting Machines; and I do hereby declare the following to be a full, clear, and exact description of the part thereof embraced in this application, reference being had to the accompanying drawing, making part of the same, in which—

Figure 1 is a transverse section of a harvesting machine, embracing said improvements, taken in line *x x*, fig. 2.

Figure 2 is a plan or top view of the same.

Figure 3 is a transverse section in line *y y*, fig. 2, showing the means for raising and lowering the cutting apparatus; and Figure 4 is a detached view showing a means for adjusting the angle of the cutters.

Similar letters of reference indicate corresponding parts in the several figures.

The improvement embraced in this application consists in combining, in a two-wheeled, side-draught machine, a main frame, arranged between the wheels, a vibrating draw-bar, or its equivalent, and a laterally-projecting hinged cutting apparatus, in such manner that said cutting apparatus shall be free at each end, independently of the other end, and of the vertical movements of the main axle of the machine, to follow the surface of the ground for the purpose hereinafter specified. It also consists in combining a laterally projecting hinged cutting apparatus, which is free at each end, independently of the other end, and of the vertical movements or vibrations of the main axle, to conform to the surface of the ground over which it is drawn, with one end of a vibrating draw-bar, or its equivalent, which is connected at its other end to the main axle gear centre, or its equivalent, in such manner that the vibration of said draw-bar shall not interfere with the proper working of the mechanism through which motion is imparted to the cutters.

To enable others to construct and use said improvement, I will describe, with reference to the drawing, how the same may be carried out in practice.

In said drawings, A represents a main frame arranged between the main carrying-wheels C C′, and connected at one end to the main axle B, on which the wheels C C′ are mounted; said frame being shown as made in a triangular or bracing form, and provided with perforated lugs or ears, by which it is connected to the axle, on which it is free to vibrate as a centre. The wheel C′ is keyed to the axle B, turning therewith, and is the drive-wheel from which motion is communicated through suitable gearing on the frame to the cutters. D is the finger-bar of the cutting apparatus, arranged to project on one side only of frame A, to the vibrating end of which it is connected by a hinge consisting of hook, *a*, passing loosely through an eye formed in the extended inner or heel end of bar D, in such manner as to turn freely therein. E is the draw-bar, which is connected at one end to the inner end of the axle or shaft, B, of the drive-wheel C′, outside of wheel C, the connection of the bar with the axle being such as to allow said axle or drive-wheel shaft to turn freely, while the other end of the bar is left free to vibrate thereon as a centre, to allow the finger-bar D, which is connected to said draw-bar, to rest upon the ground and freely follow the undulations in the surface thereof as it is drawn forward. The finger-bar is connected to the vibrating end of the draw-bar by means of a hinge joint, which consists in this instance of a hook, *b*, which is attached to the vibrating end of the draw-bar, and which passes through an eye formed in the finger-bar, near its inner finger or shoe, in such manner as to allow the finger-bar to turn or vibrate thereon, to follow the surface of the ground at each end independently of the other. The bar D is shown as extended inward beyond the brace or draw-bar F, to afford a means of attachment at *a* to the vibrating end of the frame, similar to that at *b*, above described, with the vibrating bar E. By the construction herein described, whereby the bar E is allowed to vibrate about the axle or gear-centre B, independently of the frame, and whereby also the finger-bar is adapted to turn on said bar, E, as a centre, the cutting apparatus is not only allowed to follow bodily the undulations in the surface of the ground, but each end is rendered independent of the other end, and of the vertical movements or vibrations of the main axle, which, if the bar E were made a part of and rigidly connected to the frame A, it is obvious would not be possible, and if the bar were connected to and allowed to vibrate from any other point than a gear or driving-centre of the machine it would necessarily cause a displacement or straining of the parts through which motion is communicated to the cutters.

By the arrangement and construction illustrated in the foregoing description, all danger of twisting or straining the driving mechanism is avoided; the cutting apparatus projecting laterally from the frame by which it is drawn forward, is properly supported and sustained in its working position at right angles to the path of the machine, while at the same time it is free at each end, independently of the other end and of the vertical movements or vibrations of the main axle, to follow the undulations in the surface of the ground over which it is drawn.

Other parts of the machine shown by the drawing, being fully described in other applications of even date herewith, do not require further description here.

What is claimed under this patent, as the invention of C. M. LUFKIN, is—

1. In a two-wheeled, side-draught machine, I claim the combination of a main frame, arranged between the wheels, and a vibrating draw-bar, or its equivalent, with a laterally projecting hinged cutting apparatus, which is free at each end, independently of the other end and of the vertical movements of the main axle, to conform to the surface of the ground over which it is drawn.

2. The employment, in a two-wheeled, side-draught machine, of a draw-bar, or its equivalent, connected at one end to, and vibrating about, a shaft or gear-centre of said machine, in combination with a main frame arranged between the wheels, and a laterally projecting hinged cutting apparatus.

3. A draw-bar, or its equivalent, connected at one end to, and vibrating about, the main axle or gear-centre, in combination with a laterally projecting cutting apparatus, hinged to the other end of said bar.

In testimony whereof I have hereunto set my hand this 22d day of October, 1866.

HOBART H. SMITH.

Witnesses:

J. F. GOUCHER,

S. D. HOUSTON.